May 9, 1967  F. D. DWYER  3,318,355
POSITIVE LOCK FASTENER

Filed Sept. 2, 1964 2 Sheets-Sheet 1

INVENTOR.
FRANCIS D. DWYER
BY *Dybvig and Dybvig*
HIS ATTORNEYS

May 9, 1967　　　　F. D. DWYER　　　　3,318,355
POSITIVE LOCK FASTENER
Filed Sept. 2, 1964　　　　2 Sheets-Sheet 2

INVENTOR.
FRANCIS D. DWYER
BY Dybvig and Dybvig
HIS ATTORNEYS

United States Patent Office 3,318,355
Patented May 9, 1967

3,318,355
POSITIVE LOCK FASTENER
Francis D. Dwyer, 306 Washington Ave.,
Urbana, Ohio 43078
Filed Sept. 2, 1964, Ser. No. 393,889
5 Claims. (Cl. 151—28)

This invention relates to a positive lock for fasteners, as distinguished from a friction lock, and more particularly to a means for positively locking helically threaded fastening devices against counter-rotation such as would release the fastener, however, the invention is not necessarily so limited.

Locking devices for helically threaded fastening elements have typically fallen into two broad categories. In the first category are locking devices which rely upon friction between the various elements engaged to form the fastener. The other category includes locking devices which have an interference fit with the elements forming the fastener, the arrangement being such that the locking device must be sheared or severely distorted before the fastener will release. The latter category offers the more desirable locking action, since it is more positive. However, the application of such locking devices to helically threaded fastening devices has been limited in the past, due to a limitation in the price art to the number of possible locking positions.

An object of the present invention is to provide a new and improved lock device for engaging a stud or the like.

Another object of the present invention is to provide a positive locking device for restraining rotation of relatively rotatable members which relies upon an interference fit and which is capable of performing its locking function at any position of relative rotation as between the members to be locked. Thus, in the case of a threaded bolt and a threaded nut therefor, it is an object of the present invention to provide a locking device that is capable of locking the nut non-rotatably to the bolt at any position of rotation of the nut relative to the bolt.

Another object of the present invention is to provide a new and improved fastening assembly including a locking device and a retainer therefor, so constructed and arranged that the locking device may be positively and securely distorted to an interference fit with its retainer, without limitation as to the relative positions of the locking device and its retainer.

A further object of the present invention is to provide a new and improved method for establishing a positive lock between elements otherwise relatively rotatable.

Other objects and advantages reside in the construction of parts, the combination thereof, the method of manufacture and the mode of operation, as will become more apparent from the following description.

Figure 1:
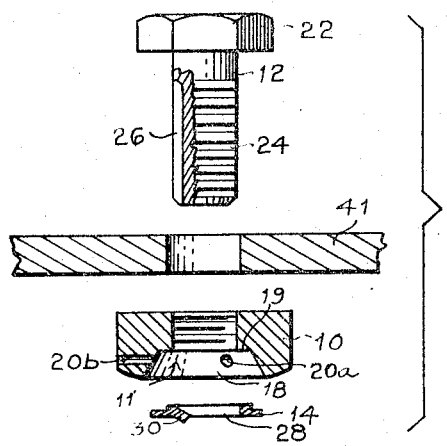
FIGURE 1 is an exploded view with a portion shown in section illustrating one embodiment of a positive lock fastener assembly of the present invention, the various elements of the fastener assembly being shown in relation to a work piece which is to be engaged thereby.

Referring to the drawings in greater detail, the fastener assembly of FIGURE 1 includes a specially adapted internally threaded nut 10, a threaded bolt or stud 12 and a locking device 14. The nut 10, which may have the conventional hexagonal outer periphery, differs from the typical hex nut in having a generally frustum-shaped countersunk recess 11 in one face thereof, the recess having a tapered side wall 18 and a flat base 19, and in having radially disposed bores 20a, 20b and 20c extending from the outer periphery of the nut through the side wall 18.

The bolt 12 is equipped with a hexagonally shaped head 22 and a threaded stem 24 and, as such, resembles a conventional machine bolt. However, it differs therefrom due to the provision of an axially extending groove 26 cutting through the threads in the stem 24.

The locking device 14 resembles a conventional washer; but differs therefrom in that the inner periphery 28 of the locking device includes an inwardly directed tongue 30, which deflects out of the plane of the locking device, as shown in FIGURE 1, and in that the inner periphery of the locking device is thickened as shown at 31 to reinforce the same. For reasons which will become more apparent in the following, the locking device is fabricated from a resilient material capable of mild distortion without fracture and, for the specific application disclosed, is preferably a metal, such as a mild steel, or a spring steel of low hardness.

Figure 2:
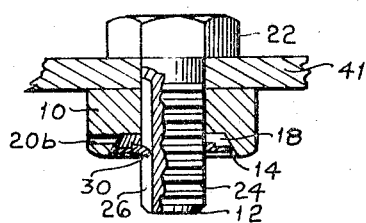
FIGURE 2 is a sectional view illustrating the assembly of the components of FIGURE 1 to the work piece.
Figure 3:
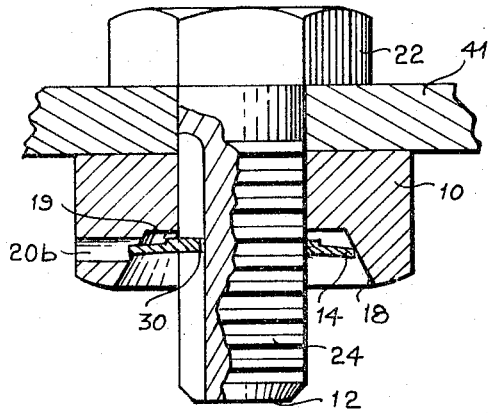
FIGURE 3 is an enlarged sectional view analogous to the sectional view of FIGURE 2, illustrating the same components after treatment to effect a locking action.

Partial assembly of the bolt 12, the nut 10 and the locking device 14 upon an illustrative work piece 41, is illustrated in FIGURE 2. In this illustration, the locking action of the locking device has not been set or put into effect. The nut 10 has been threadedly engaged with the threaded stem 24 of the bolt 12 and rotated to draw the head 22 of the bolt firmly against the work piece 41. After assembly of the nut 10 on the stem 24, the locking device 14 is slid onto the end of the stem 24 with the tongue 30 of the locking device seated in the axial groove 26 in the stem 24. In this assembly, the deflection of the tongue 30 is in a direction away from the body of the nut 10. It will be noted that the bores 20a, 20b and 20c pass through the tapered wall 18 at sites which are in substantially a common plane normal to the axis of the stem 12. It will also be noted that the diameter of the locking device 14 is such as to cause the locking device to occupy a substantially parallel plane spaced from the plane of the bores 20a, b and c. In other words, the plane occupied by the bores 20a, b and c intersects the wall 18 along a circular section, the diameter of which is less than the diameter of the locking device 14.

Figure 4:
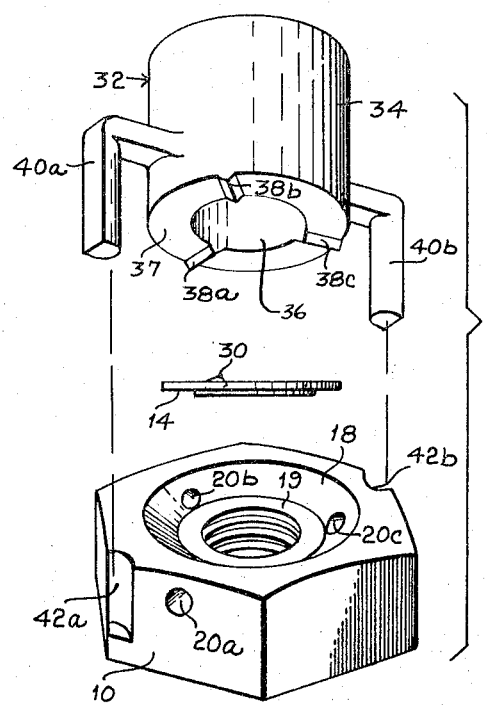
FIGURE 4 is an enlarged, exploded, perspective view illustrating one embodiment of a tool used to effect the locking action.

FIGURE 4 illustrates a tool 32 which is utilized to effect the locking action. This tool utilizes a tubular body 34 having an axially disposed interior passage 36 adapted to receive the stem 24 of the bolt 12. Fixed to diametrically disposed sides of the outer periphery of the body 34 are depending arms 40a and 40b, adapted to interfit axially extending notches 42a and 42b formed on diametrically opposite sides of the nut 10. The tubular body 34 has an operating face 37, from which project three radially extending punch elements or teeth 38a, 38b and 38c. These punch elements are registered with the arms 40a and 40b in such fashion that when the arms 40a and 40b are seated in their respective notches 42a and 42b, the teeth 38a, b and c are aligned radially with the bores 20a, b and c in the nut 10. Further, the outside diameter of the body 34 of the tool is approximately equal to the diameter of the circular section defined by the intersection of the plane occupied by the bores 20a, b and c with the divergent wall 18 of the countersunk recess 11 in the nut 10. Accordingly, upon assembly of the tool 32 upon the nut 10, absent the locking device 14, the teeth 38a, b and c would engage in the bores 20a, b and c of the nut.

With the locking device 14 in place in the countersunk recess of the nut 10, the teeth 38a, b and c on the tool 32 engage the opposing surface of the locking device 14. Thereafter, any suitable impact tool, such as a hammer, may be used to drive the tool 32 toward the nut 10, causing the locking device 14 to collapse downwardly into the countersunk recess.

Figure 11:
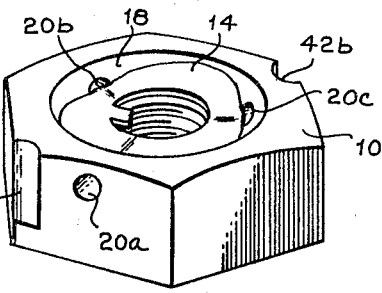
FIGURE 11 is a perspective view, illustrating the configuration of the locking device of the first embodiment after a lock has been effected, utilizing the tool of FIGURE 4.

The action of the locking device 14, upon receiving an impact from the teeth 38a, b and c, may be described approximately as follows. The outer margin of the locking device in those areas directly under the teeth 38a, b and c is caused to follow the tapered shape of the wall 18 and this forced reduction in the diameter of the locking device causes the locking device to dish. Since the teeth 38a, b and c prevent any dishing of the locking device in the direction of the tool, the locking device must dish into the recess 11 in the nut 10. As the locking device dishes, the outer margins, where not engaged by the teeth 38a, b and c, rise upwardly toward the tool, with the result that the locking device buckles or kinks along a radial line under each of the three teeth 38a, b and c. The reinforced inner periphery of the locking device resists buckling with the result that the distortion of the locking device is greatest at its outer periphery. The downward travel of the tool 32 continues until the peripheral portions of the buckled portions or kinks in the locking device bottom in the bores 20a, b and c. The preceding action occurs with a single hammer blow delivered to the tool 32 and, after delivery of this hammer blow, the tool may be removed and the locking device 14 will remain in a distorted and locked condition. The appearance of the distorted locking device is depicted approximately in FIGURE 11, the stud 12 having been omitted for clarity.

Due to the resiliency of the material thereof, the locking device 14, even though it may have been permanently deformed to some degree, retains an impulse to return to a flat condition. Thus, the outer peripheral portions intermediate the buckled portions of the locking device exert a continuing pressure against the wall 18 of the recess in the nut 10. This pressure urges the kinks upwardly in the bores 20a, b and c. However, the buckling in these areas has caused the outer ends or peripheries thereof to assume approximately their original radial dimension, whereby the outer margins of the kinks constitute peripherally limited detent portions seated firmly and irremovably from their respective bores 20a, b and c. The result is that the force tending to draw the detent portions out of their respective bores takes up any slack or looseness between the locking device and the nut 10.

Due to the dished condition of the locking device, the tongue 30 thereof, which was originally deflected out of the plane of the locking device as illustrated in FIGURE 2, is caused to approach parallelism to the base 19 of the recess in the nut 10 and to project deeper into the groove 26. It will be understood, of course, that the precise location and configuration of the tongue 30 after distortion of the locking device will depend to some extent on its location with respect to the teeth 38a, b and c at the time the impact is delivered.

It will be noted that the preceding locking action can be produced at any position of relative rotation between the nut 10 and the bolt 12. Specifically, the action of the tool 32 is such as to initiate buckling in the locking device and consequent formation of peripheral detent portions seated in the bores 20a, b and c, regardless of the rotational orientation of the locking device relative to the nut 10. Thus, the present locking action places no restriction on the operable rotary positions of the nut 10 relative to the bolt 12.

Figure 5:
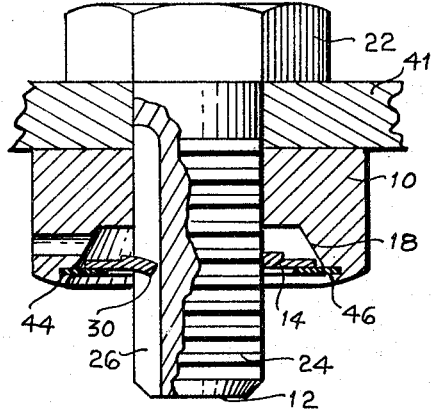
FIGURE 5 is an enlarged sectional view analogous to that of FIGURE 2, illustrating a first modification.

For certain applications, separate handling of the nut 10 and the locking device 14, such as discussed in the preceding remarks, is undesirable and, the modification of FIGURE 5 offers the advantage that the nut and the locking device are joined together in such fashion that the entire fastener may be assembled without separate handling of the nut and the locking device. To this end, the tapered wall 18 in the recess of the nut 10 is provided with an annular groove 44 penetrating radially into the wall 18 and occupying a plane spaced outwardly from but parallel to the plane occupied by bores 20a, b and c. Along with this modification, an annular flexible washer element 46, having an outer diameter only slightly less than the maximum diameter of the groove 44 in its plane, is welded or otherwise adhered to one face of the locking device 14 in concentric relation thereto. The washer 46 is attached to the face of the locking device 14 from which the tongue 30 is inclined, said face being opposite the thickened portion 31.

The material from which the washer 46 is formed is preferably a flexible, essentially flimsy material, such as polyethylene plastic. As illustrated in FIGURE 5, the outer margin of the washer 46 is seated in the annular groove 44, so as to attach the fastening device 14 to the nut 10. When the nut 10 is later assembled on the bolt 12 by relative rotation, so as to advance the nut on threaded stem 24 of the bolt, the tongue 30 on the locking device 14 eventually seats in the groove 26 as the end of the bolt 12 passes into the plane occupied by the locking device 14. The seating of the tongue 30 into the groove 26 is automatic, in that the flexible washer 46 urges the tongue 30 into the groove 26 as the end of the bolt passes rotatably through the plane occupied by the locking device 14.

As soon as the tongue 30 has seated in the groove 26, the locking device 14 and its accompanying washer 46 are caused to rotate with the bolt 12. This rotation is permitted by a loose fit between the washer 46 and its receiving groove 44, and by the concentricity between the washer 46, the annular groove 44 and the threaded stem 24. At such time as the bolt 12 has advanced into the nut 10 sufficiently to establish the desired fastening, the tool 32 may be seated in the appropriate notches of the nut 10 in preparation for delivery of an impact to the locking device 14. When this impact is delivered to the locking device through the medium of the interposed washer 46, the washer, being flimsy in relation to the material of the locking device 14 offers no resistance to the impact. Thus, the washer in no way interferes with the distortion of the locking device 14, which accomplishes the locking action previously discussed. In short, the modification of FIGURE 5 offers the advantage that the locking device may be assembled to the nut 10 in such fashion that the locking device need not be separately handled, the assembly in no way interfering with the locking action achieved in the present invention.

Figure 6:
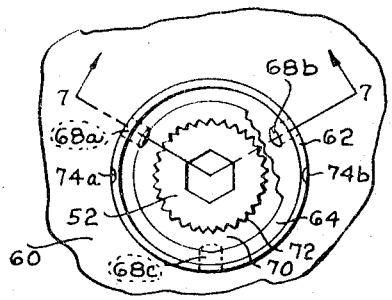
FIGURE 6 is a plan view, with a portion broken away, illustrating a second modification.
Figure 7:
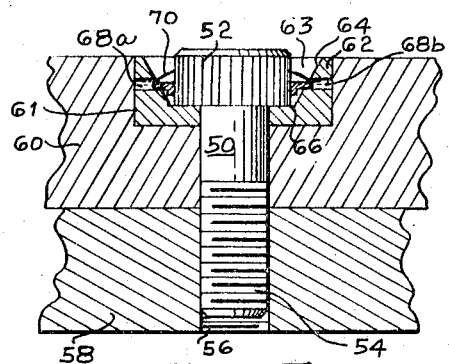
FIGURE 7 is a fragmentary, sectional view, taken substantially along the line 7—7 of FIGURE 6.

FIGURES 6 and 7 illustrate a second modification suitable for use in assemblies wherein the threaded bolt or stud is to be engaged in a threaded aperture in an element of the assembly, this being in contradistinction to the construction of the preferred embodiment, wherein the threaded bolt engages a threaded nut. FIGURES 6 and 7 also illustrate a modification of the means by which the locking device is engaged with the threaded bolt.

In this second modification, a bolt 50 having a threaded stem 54 is provided with an enlarged head 52 having a fluted or otherwise irregular periphery. To represent a typical application for the bolt 50, the bolt is illustrated in FIGURE 7 as performing the function of joining a plate 58 to a plate 60. For such purpose, the plate 58 is provided with an internally threaded bore 56, adapted to engage the threads on the stem 54.

The plate 60 is provided with a cylindrical recess 61, adapted to receive an insert or retainer 62 utilized in locking the bolt 50 against counter-rotation, such as would release the attachment between the plates 58 and 60. For this purpose, the insert 62 is press-fitted, or otherwise non-rotatably secured in the recess 61. For performance of the locking function, the insert 62 is provided with a frustum shaped recess 63, having a tapered wall 64 and a substantially flat base 66. The base 66 has a centrally disposed recess for receiving the bolt 50 which passes therethrough.

Disposed in a common plane passing through the recess 63 parallel to its base 66 are three radially disposed bores 68a, 68b and 68c which penetrate the wall 64. It will be noted that the arrangement of the frustum-shaped recess 63 and the bores 68a, b and c in the present embodiment is analogous to the arrangement of the recess 11 and the bores 20a, b and c in the nut 10 of the preferred embodiment.

Figure 10:
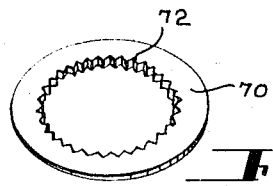
FIGURE 10 is a perspective view of a locking device employed in the modifications of FIGURES 6 through 9.

The subject modification employs a locking device 70, best illustrated in FIGURE 10, which has the general shape of a washer element, but which has a jagged inner periphery 72, complementing the fluted outer periphery of the bolt head 52, it being preferred that the inner periphery is thicker than the outer periphery as shown at 71. The arrangement is such that the locking device 70 may be fitted non-rotatably onto the bolt head 52. The outer diameter of the locking device 70 exceeds the diameter of the circular section defined by the intersection of the plane occupied by the bores 68a, b and c with the wall 64 of the recess 63. Accordingly, when the bolt 50 and insert 62 are assembled as shown in FIGURE 7, the locking device 70 may be positioned on the bolt head 52 and thereby seated in the recess 63, the locking device 70 then occupying a plane which, due to the diameter of the locking device, will be above the plane occupied by the bores 68a, b and c.

As illustrated in FIGURE 6, the insert 62 is provided with diametrically opposed notches 74a and 74b in the outer periphery thereof, which are adapted to receive the arms 40a and 40b of the tool 32, the arrangement being such that the arms 40a and 40b may be seated in the notches 74a and 74b to bring the tool into operative position with respect to the locking device 70. Upon delivery of an impact to the tool 32, as with a hammer, the locking device 70 is caused to dish inwardly in a manner previously described and, at the same time, to buckle along radial lines aligned with the bores 68a, b and c, so as to form peripheral detent portions seated in the bores 68a, b and c. It will be recognized that the distortion of the locking device 70 will be essentially the same as that described with reference to the preferred embodiment, the end result being that the locking device establishes an interference fit, both with the head 52 of the bolt 50 and with the insert 62, preventing rotation of the bolt relative to the insert 62.

Figure 8:
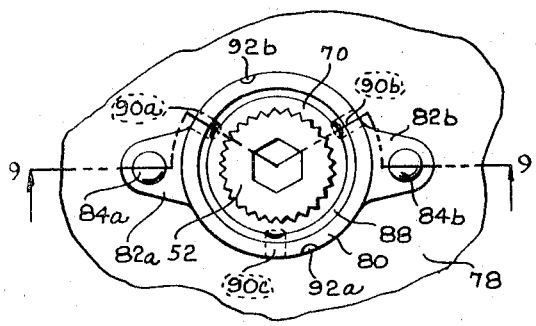
FIGURE 8 is a plan view of a third modification.
Figure 9:
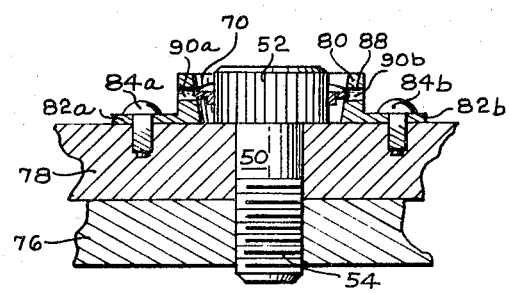
FIGURE 9 is a fragmentary, sectional view, taken substantially along the line 9—9 of FIGURE 8.

FIGURES 8 and 9 illustrate a third modification somewhat analogous to the modification of FIGURES 6 and 7; but wherein the need for a recess to receive an insert in one of the work pieces to be assembled has been eliminated. This third modification is illustrated in a representative adaptation, wherein plates 76 and 78 are to be joined together. For this purpose, the plate 76 is provided with an internally threaded bore for threadedly receiving the stem 54 of the bolt 50, the head 52 of the bolt 50 bearing directly against the work piece 78, so as to fasten the work piece 78 securely to the work piece 76.

For securing the bolt 50 against counter-rotation, such as would release the fastening between the work pieces 76 and 78, an annular retainer 80 is fitted concentrically over the head 52 of the bolt 50 and secured against rotation relative to the work piece 78 by means of brads 84a and 84b, penetrating lobes 82a and 82b on the retainer to engage the work piece 78.

The annular retainer 80 has an axially tapered and circular interior wall 88 penetrated by radially disposed bores 90a, 90b and 90c, the relationship between the wall 88 and the bores 90a, b and c being analogous to the relationship between the wall 64 and the bores 68a, b and c of the embodiment of FIGURE 7. As with the embodiment of FIGURE 7, the locking device 70 may be fitted non-rotatably upon the head 52 of the bolt 50 and thereby seated within the tapered wall 88 of the retainer 80.

As illustrated in FIGURE 8, the retainer 80 has notches 92a and 92b located in the outer periphery thereof for receiving the arms 40a and b of the tool 32, thereby registering the teeth on this tool relative to the bores 90a, b and c. Upon seating of the tool on the retainer 80, delivery of an impact to the tool distorts the locking device 70 in the manner previously described, so as to form peripheral detent portions projecting into the bores 90a, b and c. By this means, the bolt is secured against counter-rotation relative to the retainer 80 which, in turn, is non-rotatably secured to the work piece 78.

In both of the embodiments disclosed in FIGURES 6 through 9, the contacting surfaces of the work pieces joined by the fasteners illustrated are drawn into intimate contact whereby friction between said surfaces prevents relative rotation between the work pieces. In each such embodiment one of the work pieces has thread means engaging the threaded stud and one result of the frictional contact between said work pieces is that said thread means is secured non-rotatably to the annular wall which receives the locking device 70. The friction between the work pieces, by attaching said thread means to said annular wall, performs the same function as the molecular binding forces in the nut 10 of the preferred embodiment which attach the threads thereof to the annular wall 18 thereof. It is deemed apparent that the frictional forces of the embodiment of FIGURES 6 through 9 can be supplemented or replaced by a more positive connection such as a weld or an interference fit.

Figure 12:
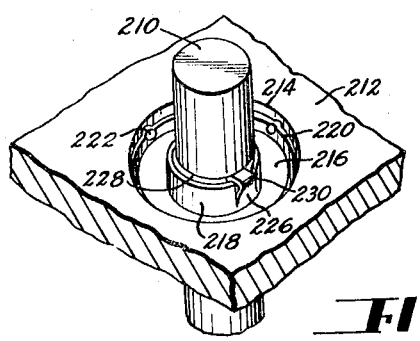
FIGURE 12 is a fragmentary perspective view illustrating a fourth modification.

FIGURE 12 illustrates a utilization of the present invention for locking a grooved stud or shaft against axial movement. Thus in FIGURE 12 a shaft 210 is secured against axial movement relative to a panel or frame member 212.

The panel 212 is provided with a countersink 214 concentric to an aperture therein which receives the shaft 210. The locking device 216 is a circular member having concentric inner and outer peripheral walls 218 and 220. The outer wall 220, which closely fits the countersink 214, is adapted for engagement by a suitable punch device for the swaging of detents 222 therein. Where the material of the panel 212 is soft, the detents 222 create their own recesses in the wall of the countersink 214, as the detents are swaged. Alternatively, where the material of the panel 212 is hard, suitable apertures or recesses (not shown) are provided in the wall of the countersink 214 to receive the detents 222.

The detents 222 function both to restrain rotation of the locking device 216 in the countersink 214 and to prevent axial movement of the locking device 216 out of the countersink. In the particular embodiment illustrated in FIGURE 12, the detents 222 are used primarily to restrain axial movement of the locking device 216 out of the countersink 214.

For restraining axial movement of the shaft 210, with respect to the panel 212, the shaft 210 is provided with an annular groove 228 and the locking device 216 is provided with an inwardly directed resilient tang 226 struck from the inner peripheral wall 218. The tang 226 is bent angularly so as to provide an axially inclined finger 230 at the end thereof.

The arrangement of the tang 226 is such that upon axial movement of the shaft 210 upwardly through the peripheral wall 218, as viewed in FIGURE 12, the end of the shaft cams against the finger 230, thus moving the tang 226 radially outwardly and creating a spring tension in the tang 226. When the groove 228 becomes aligned with the finger 230, the spring tension in the tang 226 moves the finger 230 into the groove 228. As soon as the finger 230 has seated in the groove 228, the shaft 210 is securely locked against withdrawal from the panel 212 in the opposite or downward direction. In the foregoing assembly it will be noted that the detents 222 function to secure the locking device 216 against the axial force of the shaft 210 required to move the tang 226 radially outwardly upon initial movement of the shaft upwardly through the peripheral wall 218.

From the foregoing description it is apparent that the locking device of FIGURE 12 provides an inexpensive but effective means for locking a shaft into position so as to secure the shaft against axial movement.

In each of the preceding embodiments it will be recognized that the number of detents employed to establish the interference fit for positively locking the fastener assembly is not critical and, depending upon the structural requirements for the locking device, a single detent may suffice.

It will occur to those skilled in the art that the use of radially disposed bores to receive the detents as illustrated in FIGURE 1, for example, is interchangeable with the use of wells or notches; however, it will also occur to those skilled in the art that the use of radially disposed bores will have an advantage in some assemblies, particularly those wherein occasional disassembly is a probable occurrence, since suitable tools may be inserted in the bores from the exterior of the fastener assembly to force the detent portions out of their respective bores and thereby release the locking device.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a fastener device, the combination including a body having a generally circular cavity of axial extent, said body having a radially disposed opening in the wall thereof surrounding said cavity, a sheet member having a central perforation and having a circular outer periphery, said sheet member being disposed concentrically in said cavity and occupying a plane substantially normal to the axis of said cavity, retainer means secured to said sheet member and projecting radially beyond the outer periphery thereof, and means of said body engaging said retainer means to attach said sheet member to said body, said retainer means being flimsy in relation to said sheet member whereby a peripheral portion of said sheet member may be swaged into said opening with inappreciable resistance from said retainer means.

2. In a fastener device, the combination according to claim 1, wherein said retainer means comprises a flexible annular washer fixed to said sheet member and having a circular periphery the diameter of which exceeds the diameter of said sheet member, said body having an annular radially disposed groove in the wall thereof surrounding said cavity, said groove being spaced axially from said radially disposed opening, said groove receiving the outer periphery of said retainer means, said means of said body engaging said retainer means to attach said sheet member to said body comprising surface portions of said body defining said groove.

3. A fastener assembly comprising, in combination, a threaded stud, a first body having an aperture receiving said stud and having a conical wall surrounding said aperture and a portion of said stud, said conical wall having a plurality of radially disposed recesses therein occupying substantially a common plane normal to the axis thereof, a second body having an aperture receiving said stud, said second body comprising a washer element having a circular outer periphery the diameter of which exceeds the diameter of said conical wall at said plane, said washer element having a plurality of radially disposed kinks therein, there being one kink aligned with each said recess of said conical wall and each kink terminating at its radially outermost extent in the recess aligned therewith, the portions of said outer periphery intermediate said kinks arching out of said plane in the direction of divergence of said conical wall, thread means engaging threads of said stud, means non-rotatably securing said thread means with respect to one of said bodies, and means non-rotatably securing the other of said bodies to said stud.

4. The fastener assembly of claim 3 wherein said portions of said periphery intermediate said radially disposed kinks are supported in a condition of stress by said conical wall, said intermediate portions, due to the stress thereof, acting against said conical wall to urge said second body in the direction of divergence of said conical wall.

5. In a fastening device, the combination including a body having a conical cavity and a locking device secured against rotation about the axis of said cavity, said body having a plurality of spaced openings in the wall thereof surrounding said cavity and in substantially a common plane perpendicular to the axis of said cavity, said locking device comprising a sheet member the shape of which represents a distortion of a circular sheet having an initial diameter exceeding the diameter of said wall in said common plane and having a centrally disposed perforation, said distortion constituting a plurality of radially disposed kinks each extending to the outer margin of said sheet member, there being one kink for each opening in said wall portion, the portions of said sheet member intermediate said kinks arching out of the original plane of said sheet member whereby the radial extent of the outer periphery of said sheet member is reduced intermediate said kinks and said kinks establish outwardly directed detent portions at said outer periphery, said sheet member being disposed in said cavity with said detent portions thereof seating in said openings and the intermediate arched portions thereof establishing a peripheral contour following substantially the contour of said wall, said detent portions cooperating to restrain rotation of said locking device relative to said body about the axis of said cavity.

References Cited by the Examiner

UNITED STATES PATENTS

| | | | |
|---|---|---|---|
| 893,473 | 7/1908 | Fries | 287—20 |
| 895,441 | 8/1908 | Dorff | 29—520 |

(Other references on following page)

UNITED STATES PATENTS

| | | | |
|---|---|---|---|
| 1,341,279 | 5/1920 | Offner | 151—53 |
| 1,616,996 | 2/1927 | Talaga | 151—54 |
| 1,627,912 | 5/1927 | Lomason | 151—42 |
| 1,755,807 | 4/1930 | Boles | 151—28 |
| 1,795,570 | 3/1931 | Nilson | 151—27 |
| 1,877,665 | 9/1932 | Hutchings | 151—27 |
| 1,896,388 | 2/1933 | Zeidler | 151—28 |
| 1,911,916 | 5/1933 | Menamin | 287—53 |
| 2,001,645 | 5/1935 | Abell | 151—2 |
| 2,078,212 | 4/1937 | Leighton | 29—520 |
| 2,491,356 | 12/1949 | Anderson | 287—53 |
| 2,718,417 | 9/1955 | Hansen | 287—53 |

FOREIGN PATENTS

| | | |
|---|---|---|
| 510,524 | 10/1930 | Germany. |
| 872,893 | 4/1953 | Germany. |
| 9,651 | 4/1907 | Great Britain. |
| 565,103 | 10/1944 | Great Britain. |
| 950,553 | 2/1964 | Great Britain. |
| 229,675 | 2/1944 | Switzerland. |

OTHER REFERENCES

Ser. No. 382,653, Ozuka (A.P.C.), published May 1943.

CARL W. TOMLIN, *Primary Examiner.*

M. PARSONS, Jr., *Assistant Examiner.*